United States Patent
Katukam et al.

(10) Patent No.: US 7,051,113 B1
(45) Date of Patent: May 23, 2006

(54) METHOD AND APPARATUS FOR COMPUTING A PRIMARY PATH WHILE ALLOWING FOR COMPUTING AN ALTERNATE PATH BY USING A BLOCKED LIST

(75) Inventors: Suresh Katukam, Rohnert Park, CA (US); Venkataraman Anand, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 1017 days.

(21) Appl. No.: 09/872,177

(22) Filed: Jun. 1, 2001

(51) Int. Cl.
*G06F 15/173* (2006.01)

(52) U.S. Cl. ............... 709/239; 709/240; 709/241; 370/225; 379/273

(58) Field of Classification Search ........ 709/238–241; 370/216, 221, 225, 238, 255; 398/1, 2, 57; 379/272, 273
See application file for complete search history.

(56) References Cited

U.S. PATENT DOCUMENTS

| | | | |
|---|---|---|---|
| 5,253,248 A | 10/1993 | Dravida et al. ............... 370/16 |
| 5,459,716 A | 10/1995 | Fahim et al. |
| 5,467,345 A | 11/1995 | Cutler, Jr. et al. ........... 370/60 |
| 5,497,368 A | 3/1996 | Reijnierse et al. ........... 370/54 |
| 5,627,822 A | 5/1997 | Edmaier et al. ............. 370/218 |
| 5,854,899 A | 12/1998 | Callon et al. .......... 395/200.68 |
| 5,923,646 A | 7/1999 | Mandhyan |
| 6,073,248 A | 6/2000 | Doshi et al. .................... 714/4 |
| 6,078,590 A | 6/2000 | Farinacci et al. ........... 370/432 |
| 6,185,210 B1 | 2/2001 | Troxel ........................ 370/395 |
| 6,272,107 B1 * | 8/2001 | Rochberger et al. ........ 370/216 |
| 6,430,150 B1 | 8/2002 | Azuma et al. |
| 6,549,513 B1 * | 4/2003 | Chao et al. .................. 370/227 |
| 6,643,464 B1 * | 11/2003 | Roorda et al. ................ 398/59 |
| 6,646,990 B1 | 11/2003 | Gray et al. |
| 6,671,819 B1 | 12/2003 | Passman et al. |
| 6,744,775 B1 * | 6/2004 | Beshai et al. ............... 370/409 |
| 6,751,190 B1 | 6/2004 | Swallow |
| 6,765,880 B1 | 7/2004 | Hillard et al. |
| 6,768,718 B1 * | 7/2004 | Beshai et al. ............... 370/237 |
| 6,804,712 B1 * | 10/2004 | Kracht ........................ 709/223 |
| 6,813,241 B1 * | 11/2004 | Wang et al. ................. 370/228 |
| 2002/0004843 A1 * | 1/2002 | Andersson et al. ......... 709/238 |
| 2003/0063613 A1 * | 4/2003 | Carpini et al. .............. 370/401 |
| 2003/0076816 A1 | 4/2003 | Naranjo et al. |

\* cited by examiner

*Primary Examiner*—Saleh Najjar
*Assistant Examiner*—Oanh Duong
(74) *Attorney, Agent, or Firm*—Aka Chan LLP

(57) ABSTRACT

Methods and apparatus for creating a primary path such that the ability to create a corresponding alternate path, if one exists, is effectively ensured are disclosed. According to one aspect of the present invention, a method for creating a circuit path includes selecting a first unprotected link, and identifying a first potential unprotected path segment that includes the first unprotected link and is arranged between a first node and a second node. A determination is automatically made regarding whether the first potential unprotected path segment has a corresponding first alternate path segment between the first node and the second node. If it is determined that the first potential unprotected path segment has a corresponding first alternate path segment, the first unprotected link is added to the first potential unprotected path segment. Then, the first potential unprotected path segment is designated as an unprotected path segment of the circuit path.

36 Claims, 5 Drawing Sheets

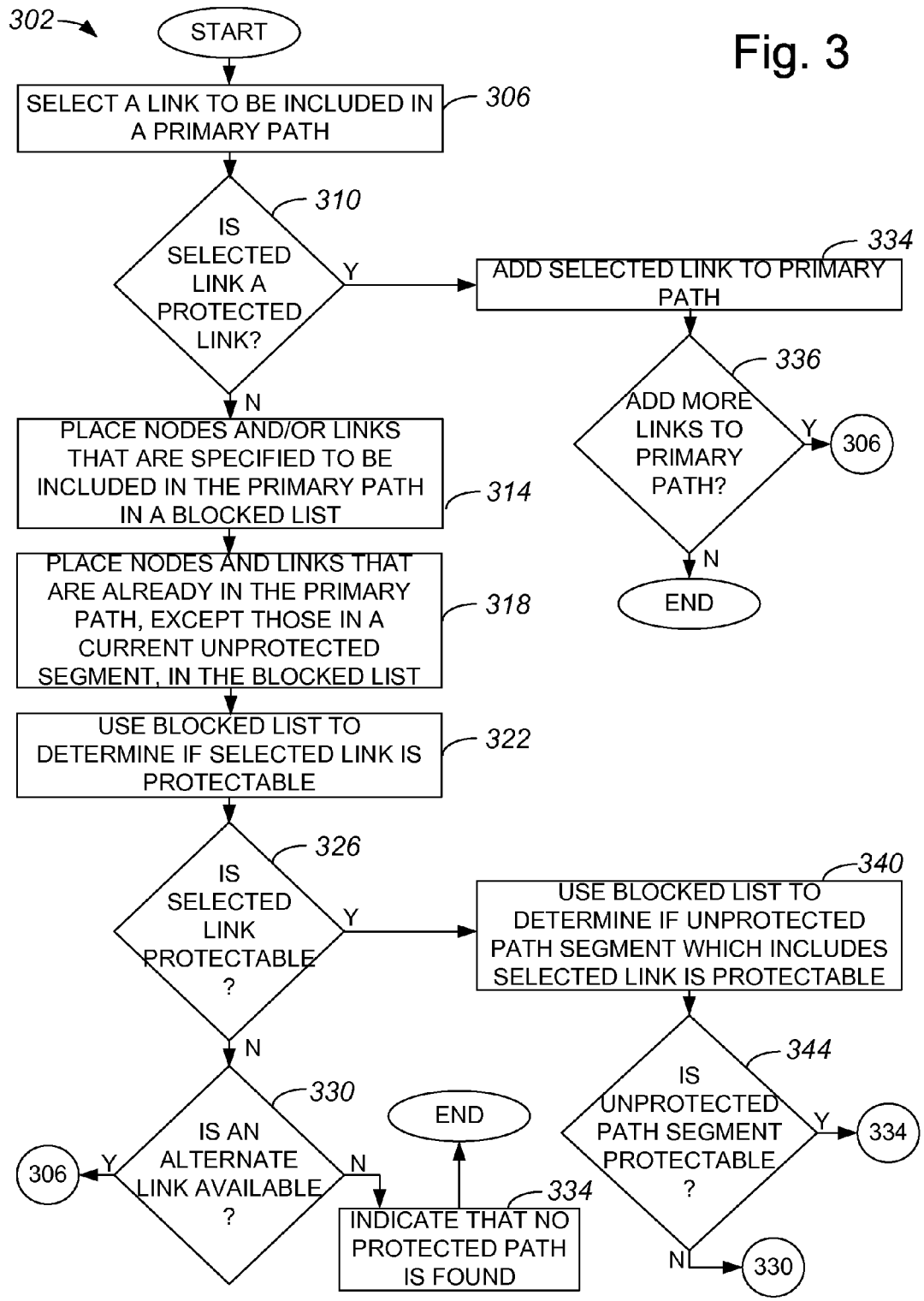

METHOD AND APPARATUS FOR COMPUTING A PRIMARY PATH WHILE ALLOWING FOR COMPUTING AN ALTERNATE PATH BY USING A BLOCKED LIST

BACKGROUND OF THE INVENTION

1. Field of Invention

The present invention relates generally to data communication systems. More particularly, the present invention relates to systems and methods for creating a primary path while effectively ensuring that an alternate path to the primary path is available.

2. Description of the Related Art

The demand for data communication services is growing at an explosive rate. Much of the increased demand is due to the fact that more residential and business computer users are becoming connected to the Internet. Furthermore, the types of traffic being carried by the Internet are shifting from lower bandwidth applications towards high bandwidth applications which include voice traffic and video traffic.

To address the demand for data communication services, the use of optical networks, such as a synchronous optical network (SONET), is becoming more prevalent. As will be appreciated by those skilled in the art, a SONET network is an example of a time division multiplexed (TDM) network. TDM networks generally allocate single lines to be used amongst multiple data streams or connections. The single lines may each be divided into slots of time during which each user has access to the single lines.

A network such as a TDM network is generally designed to ensure that information may be transferred between nodes within the network. Often, within a network, information is transferred between two specified nodes, i.e., a source node that sends information and a destination node which receives information. When information is to be sent between a source node and a destination node, a circuit path between the two nodes must be computed so that leased line services may be provided.

Often, to increase the likelihood that data will be successfully transferred, a circuit path between a source node and a destination node may be protected. A protected circuit path is a path which includes redundancy that generally allows data to be transferred even in the event of a nodal failure or a link failure. A protected circuit path may include protected links, e.g., links with '1+1' protection, as will be appreciated by those skilled in the art. A protected circuit path may also include unprotected links, provided that there is a corresponding alternate circuit path associated with the unprotected links. An alternate circuit path effectively serves as a "back up" path to a primary circuit path which includes unprotected links in the event that the primary circuit path fails. For instance, when a primary circuit path suffers either a nodal failure or a failure of a link, data that was to be sent through the primary circuit path may be sent through the alternate circuit path instead. As some protected circuit paths may include both protected path segments and unprotected segments, some protected paths may include "partial" alternate path segments which correspond to the unprotected segments.

FIG. 1a is a diagrammatic representation of a portion of a network which includes nodes and unprotected links. Within a network portion 102, nodes 104 are connected to other nodes 104 through links 108. Information or data that is to be routed through portion 102 is routed from a source node 104a to a destination node 104d. As shown, using a routing algorithm such as a shortest path first (SPT) algorithm, a circuit path 112 between node 104a and node 104d may be created such that path 112 passes through node 104b and node 104c.

When it is desired for circuit path 112 to be protected, since links 108 are unprotected links, an alternate path which corresponds to path 112 may be created after path 112 is created. The creation of an alternate path prevents a failure of a link 108 or a node 104 within path 112 from preventing the successful routing of data from node 104a to node 104d. In other words, an alternate path effectively provides protection for path 112, or primary path 112, which includes unprotected links 108. As shown, a protected path such as path 112 may include unprotected links, i.e., links 108, which may be protected using an alternate path which also includes unprotected links 108.

With reference to FIG. 1b, an alternate circuit path which corresponds to path 112, will be discussed. When an element within path 112 of FIG. 1a fails, e.g., when node 104b suffers a failure, data may be sent between node 104a and node 104d through an alternate path 116, which bypasses node 104b and node 104c which are a part of path 112. Alternatively, the data may be sent across both path 112 and alternate path 116 to node 104d, substantially simultaneously, such that node 104d may effectively select the data it wishes to receive. That is, when the data is sent across both path 112 and alternate path 116, node 104d may then determine if an element in path 112 has failed. If an element in path 112 has failed, then node 104d may elect to use the data received on alternate path 116. Alternate path 116 generally does not use nodes 104 or links 108 which are included in path 112, thereby enabling alternate path 116 to be both nodal diverse and link diverse with respect to path 112. That is, alternate path 116 is typically nodal diverse and link diverse. Hence, when a node 104 or a link 108, e.g., node 104b as shown, fails, alternate path 116 is substantially unaffected.

FIG. 1c is a diagrammatic representation of portion 102 which shows a circuit path 120 which allows data to be transferred from node 104a to a destination node 104h. As no alternate path is available for path 120, when an element of path 120 fails, data may not be transferred from node 104a to node 104h. For example, as shown in FIG. 1d, when node 104g fails, data may not be passed from node 104a to node 104h.

As previously mentioned, when path protection is needed and only unprotected links are available for use in creating a path, it is preferable to have an alternate path exist for a corresponding primary path, since an alternate path may be used to allow data to be transmitted when a primary path fails. Typically, an alternate path is computed after the computation of a primary path. That is, after a primary path is routed, it is then determined whether it is possible to route an alternate path. If it is possible to route an alternate path, the alternate path is routed. Alternatively, in situations where it is not possible to route an alternate path, then an alternate path is not routed. In the event that protection is desired but an alternate path is not possible, an attempt may be made to create a different primary path which includes, for instance, protected links, as will be appreciated by those skilled in the art.

Creating an alternate path often uses a substantial amount of computational overhead, and may be time-consuming. When the result of an attempt to create an alternate path is successful, i.e., when an alternate path exists, then the alternate path is created, and the computational overhead and time associated with computing the alternate path is effectively not wasted. However, when there is no possible alternate path that corresponds to a given primary path, then the computational overhead and the time associated with attempting to create the alternate path is essentially wasted, as is the computational overhead and the time spent in determining the primary path. The computational overhead and time spent in determining the primary path may be considered as wasted, since when an alternate path is required, the failure to create an alternate path typically results in a need to route a new primary path. Once this new primary path is routed, then another attempt may be made to create a corresponding alternate path. Such a process is often relatively time-consuming and, as a result, inefficient.

Therefore, what is needed is a method and an apparatus for efficiently identifying alternate circuit paths that correspond to primary circuit paths. Specifically, what is desired is a system which effectively validates the existence of an alternate circuit path during the computation of a primary circuit path, before an attempt is made to route the alternate circuit path.

SUMMARY OF THE INVENTION

The present invention relates to creating a primary path such that the ability to create a corresponding alternate path, if one exists, is effectively ensured. According to one aspect of the present invention, a method for creating a circuit path within a network includes selecting a first unprotected link, and identifying a first potential unprotected path segment that includes the first unprotected link. The first potential unprotected path segment is arranged between a first node and a second node. A determination is automatically made regarding whether the first potential unprotected path segment has a corresponding first alternate path segment between the first node and the second node. If it is determined that the first potential unprotected path segment has a corresponding first alternate path segment, then the first unprotected link is added to the first potential unprotected path segment. Then, the first potential unprotected path segment is designated as an unprotected path segment of the circuit path.

In one embodiment, the first potential unprotected path segment includes at least a second unprotected link. In another embodiment, when it is determined that the first potential unprotected path segment does not have a corresponding first alternate path segment, the first unprotected link is not added to the first potential unprotected path segment. In such an embodiment, the method may also include selecting a second unprotected link from the plurality of links, identifying a second potential unprotected path segment that includes the second unprotected link that is arranged between the first node and the second node, and automatically determining when the second potential unprotected path segment has a corresponding second alternate path segment between the first node and the second node.

A system which enables the existence of an alternate path segment to be effectively verified before establishing a primary path segment which corresponds to the alternate path segment enables the eventual computation of the alternate path segment to occur more efficiently. That is, when an alternate path segment exists and the existence of the alternate path segment is effectively validated before a primary path is completely routed, computations associated with creating the alternate path segment will generally be successful. Hence, time-intensive computations which may occur in an attempt to create an alternate path segment when one does not exist may be avoided.

According to another aspect of the present invention, an apparatus for computing a primary path within a network or nodes and links includes a means for identifying a path segment and means for validating. The means for identifying the path segment identifies an unprotected path segment that includes a first unprotected link and enables data to be transferred between a first node and a second node. The means for validating determines when the network includes a first alternate path segment that corresponds to the unprotected path segment. When it is determined that the network includes the first alternate path segment, the first unprotected link is added to the primary circuit path.

In one embodiment, the apparatus also includes a means for identifying a link that identifies the first unprotected link to be included in the primary circuit path. In such an embodiment, when it is determined that the network does not include the first alternate path segment, the first unprotected link is not included in the primary circuit path, and the means for identifying the link identifies a second unprotected link included in the plurality of links to be included in the primary circuit path.

According to still another aspect of the present invention, a method for creating a circuit path within a network includes identifying a first potential unprotected path segment, and determining when the first potential unprotected path segment has a corresponding first alternate path segment. The first potential unprotected path segment includes a first unprotected link, in is arranged between a first node and a second node of the network. The first alternate path segment is also arranged between the first node and the second node. The method also includes adding the first unprotected link to an unprotected segment of the circuit path when it is determined that the first potential unprotected path segment has the corresponding first alternate path segment. In one embodiment, the first potential unprotected path segment includes the unprotected segment of the circuit path.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 1b is a diagrammatic representation of a portion of a network, i.e., portion 102 of FIG. 1a, which includes an alternate circuit path that corresponds to a primary circuit path, i.e., primary circuit path 112 of FIG. 1a.

FIG. 3 is a process flow diagram which illustrates the steps associated with creating a protected primary circuit path while validating the existence of an alternate circuit path in accordance with an embodiment of the present invention.

DETAILED DESCRIPTION OF THE EMBODIMENTS

Within a network such as a time division multiplexed (TDM) network which is subject to synchronous optical network (SONET) standards, creating an alternate path that corresponds to a primary path in order to provide protection for the primary path may be time-consuming, and may use a relatively significant amount of computational overhead. When the result of an attempt to create an alternate path is a determination that there is no possible alternate path that corresponds to a given primary path, then the computational overhead and the time associated with attempting to create the alternate path is essentially wasted, as is the computational overhead and the time spent in determining the primary path, since it may be necessary to identify a new primary path. After a new primary path is routed, another attempt may be made to create a corresponding alternate path. Repeatedly routing primary paths, and attempting to route corresponding alternate paths, is often relatively time-consuming and, as a result, inefficient.

Validating the existence of an alternate path during the computation of a corresponding primary path effectively ensures that an alternate path, if one exists, may be computed. Validating the existence of an alternate path may include, in one embodiment, studying each unprotected link that is potentially to be included in the primary path to determine if an overall unprotected segment of the current primary path that includes the link is protectable. That is, when an unprotected link is being considered for inclusion in a primary path, it is determined if an alternate path segment that corresponds to the current unprotected segment which includes the unprotected link exists. Verifying the existence of an alternate path segment, if in fact one exists, effectively ensures that when it is time to actually route the alternate path segment, the alternate path segment will be successfully routed.

Figure 1A:
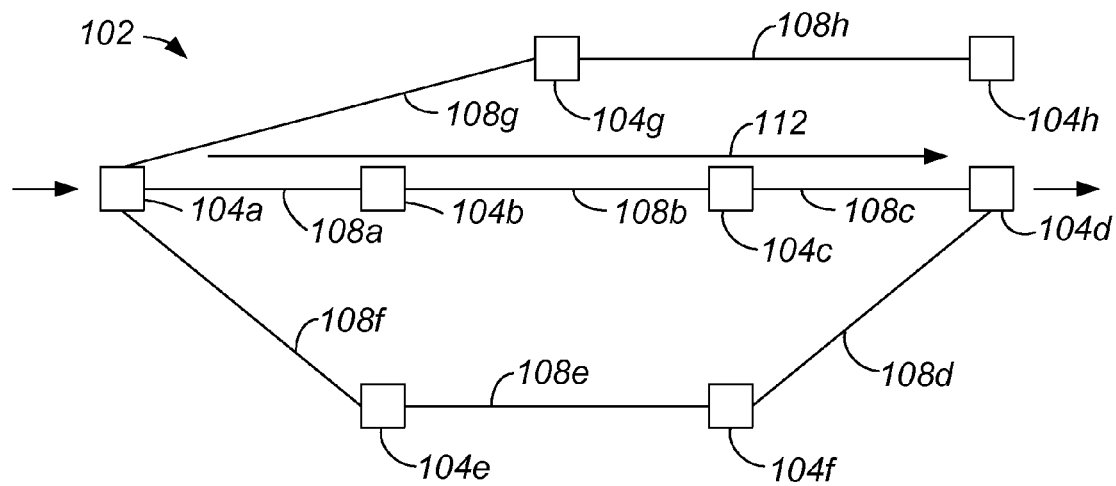
FIG. 1a is a diagrammatic representation of a portion of a network which includes a first primary circuit path.
Figure 1B:
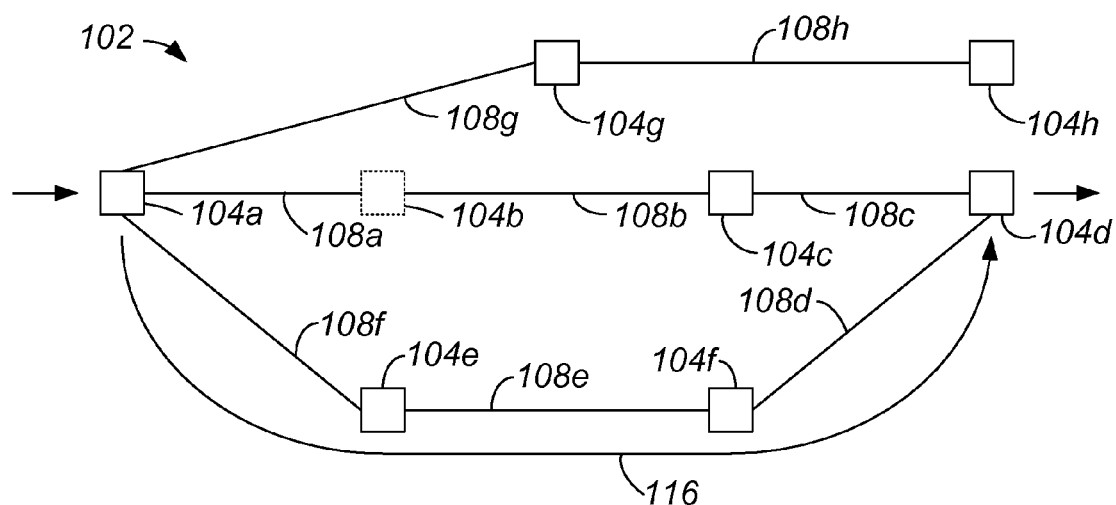
Figure 1C:
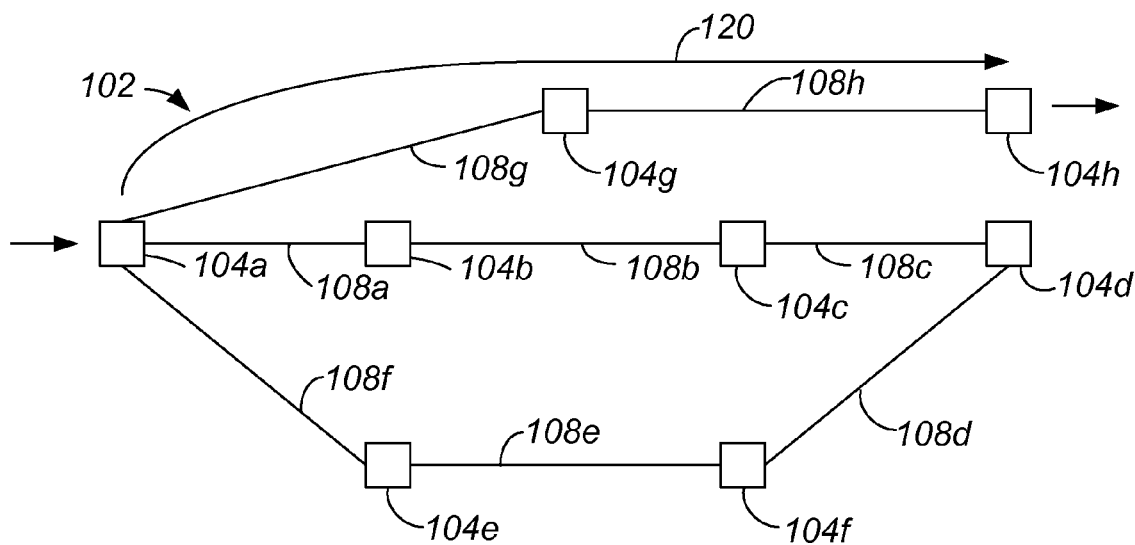
FIG. 1c is a diagrammatic representation of a portion of a network, i.e., portion 102 of FIG. 1a, which includes a second primary circuit path.
Figure 1D:
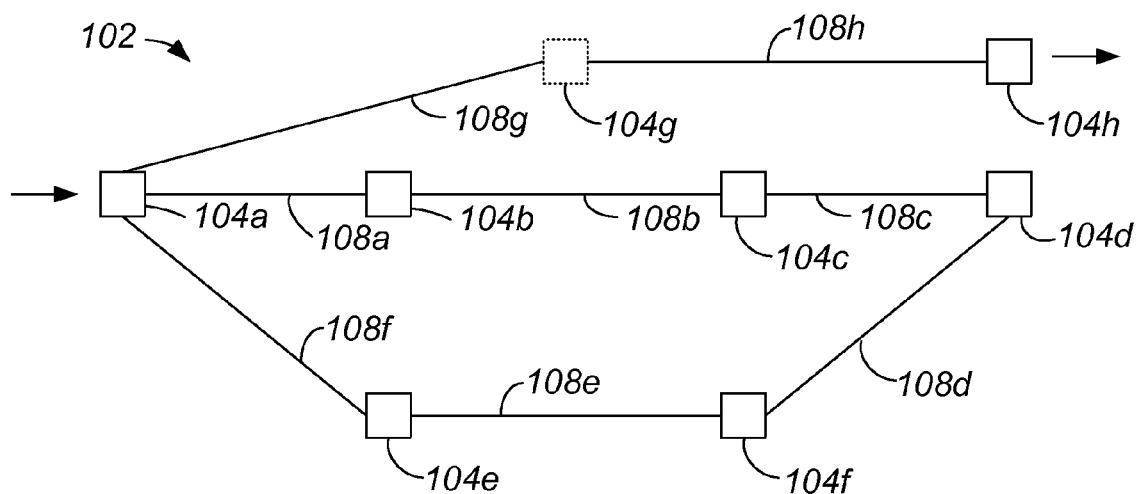
FIG. 1d is a diagrammatic representation of a portion of a network, i.e., portion 102 of FIG. 1a, which includes a failed node.
Figure 2A:
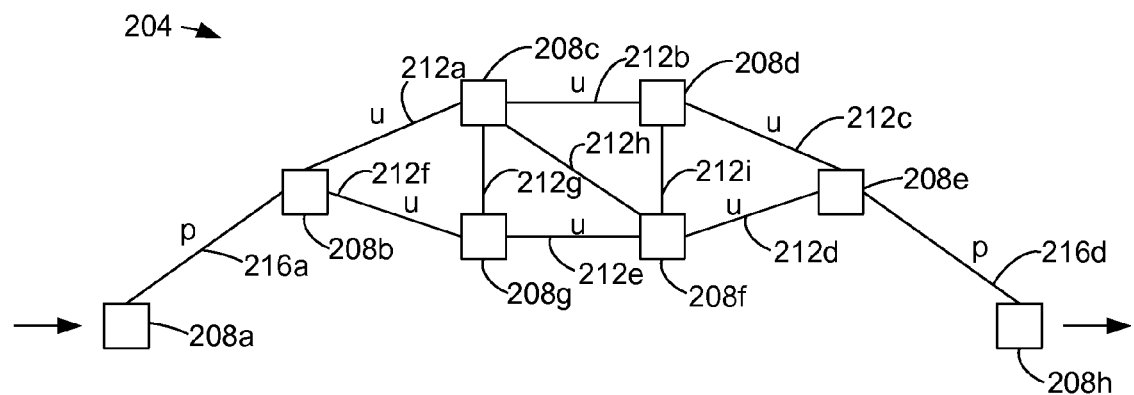
FIG. 2a is a diagrammatic representation of a portion of a network in accordance with an embodiment of the present invention.

With reference to FIG. 2a, the validation of an alternate circuit path substantially during the computation of a primary circuit path will be described. FIG. 2a is a diagrammatic representation of a portion of a network in accordance with an embodiment of the present invention. A portion 204 of a network, e.g., a SONET, includes nodes 208 and links 212, 216. Links 212 are unprotected links, while links 216 are protected links, e.g., 1+1 links. A primary circuit path which is to be routed within portion 204 is to be a protected circuit path and, hence, includes protected links 216. Data is transferred from node 208a across protected link 216a to node 208b, then ultimately from node 208e across protected link 216b to node 208h. However, there are no protected links between node 208b and node 208e. Hence, a primary path between node 208a and node 208h includes protected sections which are substantially sandwiched around an unprotected section. Further, between node 208b and node 208e, a primary circuit path segment will preferably have a corresponding alternate circuit path segment.

Within the unprotected section, which may be a unidirectional path switched ring (UP SR) that has a source node 208b and a destination node 208e, a primary path segment is to be routed such that an alternate path segment which corresponds to the primary path segment may be substantially guaranteed. Typically, in order to effectively ensure that the failure of either a link 212 or a node 208 in the primary path segment does not prevent the corresponding alternate path segment from being used, constraints such as nodal diverse or link diverse constraints may be used with respect to the alternate path segment. In other words, either or both nodes and links included as components within a primary path segment may not be included within the corresponding alternate path segment.

A primary path segment within an unprotected section of portion 204 may pass from node 208b through nodes 208c, 208d before reaching node 208e. As shown, an alternate path segment which corresponds to the primary path segment within the unprotected section of portion 204 may pass from node 208b to node 208g, then through node 208f en route to node 208e. Hence, the primary path segment within the unprotected section includes links 212a–c, while the alternate path segment within the unprotected section includes links 212d–f.

While the primary path segment and the alternate path segment may be swapped, i.e., while links 212d–f could have been the primary path segment with links 212a–c forming the alternate path segment, the selection of primary path segment with links 212a–c may be based upon a variety of different factors. For instance, although a segment with links 212a–c and a segment with links 212d–f may be characteristically the same, the cost associated with the segments may vary. The choice of the segment with links 212a–c over the segment with links 212d–f as a primary path segment may be based on a higher cost associated with links 212d–f. Alternatively, the bandwidth associated with links 212a–c may be higher than the bandwidth associated with links 212d–f and, as a result, a choice of links 212a–c may be made to substantially maximize available bandwidth.

As each unprotected link 212 is being considered for inclusion in a primary path segment, that link 212 may be checked to determine if it, as well as the current overall unprotected primary path segment that includes link 212, are protectable. For instance, when link 212a is being checked, it may be determined that link 212a is protectable, e.g., through links 212f and 212g. Since link 212a may be the only component of a current unprotected primary path segment, an alternate path segment which corresponds to the current unprotected primary path segment which includes link 212a exists, and includes link 212f and link 212g.

Likewise, as shown, link 212b may also be protectable, e.g., using link 212h and link 212i. Further, when link 212b is being considered for inclusion in a current unprotected primary path segment, the current unprotected primary path segment which also includes link 212a, has an associated alternate path segment which includes link 212f, link 212e, and link 212i.

Figure 2B:
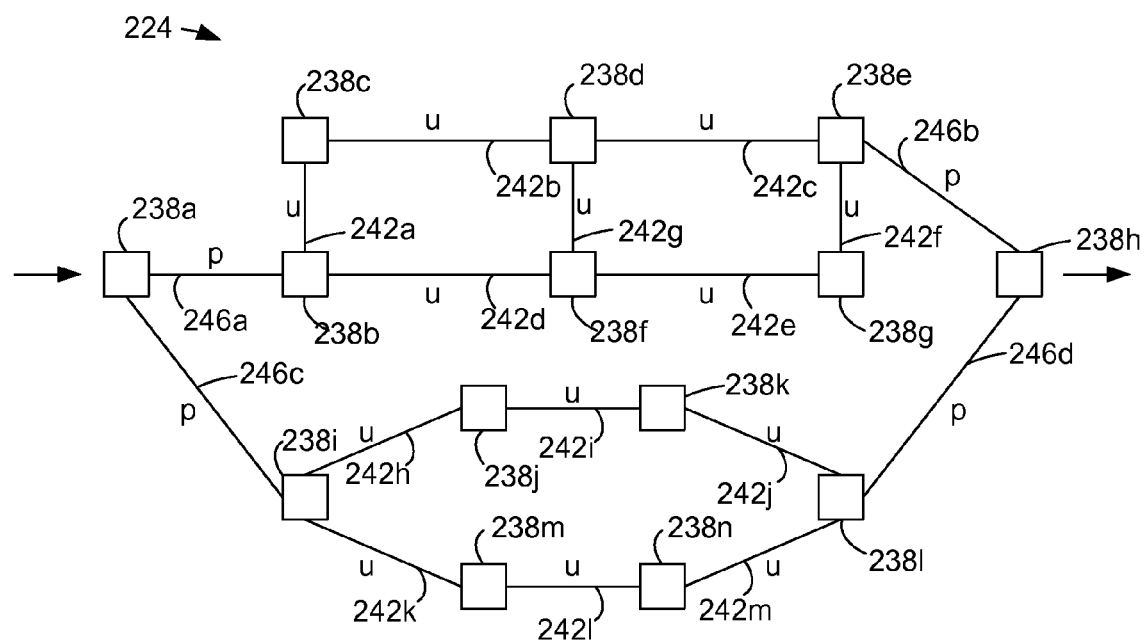
FIG. 2b is a diagrammatic representation of a portion of a network which includes a protectable link within an unprotected primary path segment which does not have an associated alternate path segment in accordance with an embodiment of the present invention.

In some cases, while an unprotected link may be protectable, an unprotected path segment which includes the unprotected link may not be protectable. As such, rather than simply determining whether a particular link is protectable, in order to substantially ensure that an alternate path may be computed if an alternate path exists, while computing a primary path, checks may be made to determine if an alternate path may be computed. FIG. 2b is a diagrammatic representation of a portion of a network which includes a protectable link within an unprotected primary path segment which does not have an associated alternate path segment in accordance with an embodiment of the present invention. A portion 224 of a network includes nodes 238, protected links 246, and unprotected links 242.

When a circuit path between node 238a and node 238h is desired, and more than one potential circuit path exists, a selection may be based upon whether a protected circuit path or an unprotected circuit path is preferred. Once either a protected circuit path or an unprotected circuit path is selected, a shortest available path, which may be routed using any suitable algorithm such as a shortest path first (SPT) algorithm, may then be selected.

In the described embodiment, a protected circuit path is desired. When a protected circuit path is to be routed, then the selection of a suitable path may be based upon how well a primary path may be protected. For example, if a primary path that uses protected link 246a and link 246b is being considered, then unprotected links 242a–c which form an unprotected path segment may be studied to determine if an alternate path segment that corresponds to unprotected links 242a–c may be substantially guaranteed. As shown, unprotected links 242a–c between node 238b and node 238e are each protectable. In addition, an alternate path which includes unprotected links 242a–c exists between node 238b and node 238e. Hence, each of unprotected links 242a–c is individually protectable, and a primary path segment which includes unprotected links 242a–c is protectable.

It should be appreciated, however, that validating that particular links 242 are protectable does not substantially guarantee that the unprotected path segment which includes unprotected links 242 exists when, in fact, such an alternate path segment may not exist. By way of example, a primary path which includes unprotected link 242d, unprotected link 242g, and unprotected link 242c is such that each link in itself is protectable. In other words, unprotected link 242d is protectable, unprotected link 242g is protectable, and unprotected link 242c is protectable. However, a primary path which includes unprotected link 242d, unprotected link 242g, as well as unprotected link 242c is not protectable. That is, there is no alternate path segment which corresponds to a primary path segment between node 238b and node 238e that includes unprotected link 242d, unprotected link 242g, and unprotected link 242c.

The ability to determine, during the creation of a primary path, that an alternate path segment which corresponds to the primary path may not exist enables the creation of that primary path to be substantially aborted in favor of creating a different primary path which may have an associated alternate path segment. Enabling a determination of whether an alternate path segment may be successfully computed to be made during the course of routing a primary circuit path effectively avoids the expenditure of significant computing resources and time associated with an unsuccessful attempt at computing an alternate path segment, as well as having to completely recalculate a new primary path. Hence, essentially validating the existence of an alternate path segment while creating a primary circuit path is a relatively efficient use of time and computing resources.

Validating the existence of an alternate path segment during the creation process of a primary path between node 238a and node 238h may, in one embodiment, result in the selection of a primary path which uses unprotected links 242a–c, as discussed above. In another embodiment, creating a primary path while validating the existence of an alternate path segment between node 238a and node 238h may result in the creation of a primary path between node 238a and node 238h which includes protected link 246c, protected link 246d, and unprotected links 242h–j. Validating procedures during the routing of an unprotected path segment of the primary path may effectively guarantee the existence of an alternate path segment which includes unprotected links 242k–m. Hence, after the primary path is computed, an alternate path segment which includes unprotected links 242h–j may be readily computed using substantially any suitable method.

Referring next to FIG. 3, the steps associated with creating a protected primary circuit path will be described. Specifically, a process of creating a protected circuit path that includes validating the existence of an alternate circuit path that corresponds to unprotected segments of the primary circuit path will be described in accordance with an embodiment of the present invention. A process 302 of creating a protected primary circuit path begins at step 306 in which a link that is to be included in the primary path is selected. The link may generally be automatically selected by a SPT algorithm that is executing on a computing device, e.g., a computing device associated with a node of a network.

Once a link is selected, a determination is made in step 310 regarding whether the selected link is a protected link. That is, it is determined whether the selected link is a protected link or an unprotected link. If it is determined that the selected link is a protected link, then the selected link is added to the primary path in step 334. Once the selected link is added to the primary path, then a determination is made in step 336 as to whether there are more links to be added to the primary path. In other words, it is determined if the computation of the primary path is completed. If the determination is that the computation of the primary path is completed, then the process of computing a protected primary path is completed. Alternatively, if it is determined in step 336 that there are additional links to add to the primary path, process flow returns to step 306 in which a new link is selected.

Returning to step 310, if it is determined that the selected link is not a protected link, then the implication is that the selected link is an unprotected link. Accordingly, process flow moves from step 310 to step 314 in which substantially any nodes and/or links that are specified as being included in the primary path are placed in a blocked list. As will be appreciated by those skilled in the art, certain nodes may be specified as being required in a primary path, e.g., when particular drops are to be added within a network. Certain links may also be specified as being required in a primary link, as for example for load balancing purposes. Hence, nodes and links that are required as a part of a primary path may not be included in an alternate path segment if nodal diverse and link diverse constraints are to be met. In other words, nodes and links included in a protected primary path may not be included in an alternate path segment associated with the primary path if the primary path is to be properly protected.

The blocked list is arranged to include nodes and/or links which are to be considered as being inaccessible either when a determination is being made regarding whether a link in question is protectable or when a determination is being made regarding whether an alternate path segment exists for a path segment that includes the link in question. Such a blocked list may be of substantially any suitable form, e.g., the blocked list includes a table or an array of blocked elements.

After the nodes and/or links that are specified to be included in the primary path are placed in the blocked list in step 314, the blocked list is further augmented to include nodes and/or links that are already a part of the primary path, but not part of an unprotected segment that includes the selected link, in step 318. That is, at least one of nodes and links that are already included in already protected segments of the primary path are added to the blocked list to prevent those nodes and links from being used in the validation of an alternate path.

The blocked list is used in step 322, e.g., by an SPT algorithm, to determine if the selected link is protectable. In one embodiment, determining whether the selected link is protectable includes determining whether a different link or links, which are not included in the blocked list, may be suitable for effectively replacing the selected link in the event that the selected link fails. A determination is then made in step 326 as to whether the selected link is protectable. If it is determined that the selected link is not protectable, then a different link may be selected to effectively replace the selected link. Accordingly, process flow returns to step 330 in which it is determined whether an alternate link to the selected link is available.

If it is determined in step 330 that an alternate link to the selected link is available, then process flow returns to step 306 in which a link which is to be included in a primary path is selected. Alternatively, if it is determined in step 330 that an alternate link is not available, then in step 334, an indication that no protected path is found may be made, e.g., to a network administrator. Once such an indication is made, the process of computing a protected primary path is completed.

Returning to step 326 and the determination of whether the selected link is protectable, if it is determined that the selected link is protectable, then an unprotected circuit path segment which includes the link may be checked, as for example by the SPT algorithm, to determine if an alternate path segment which corresponds to the unprotected circuit path segment exists. Accordingly, in step 340, the blocked list is used to determine whether the unprotected path segment which includes the selected link is protectable.

If it is determined in step 344 that the unprotected path segment is not protectable, then the indication is that an alternate link, if available, should be chosen in lieu of the selected link for use in the primary path. Hence, process flow proceeds to step 330 and the determination of whether an alternate link is available. On the other hand, if it is determined in step 344 that the unprotected path segment is protectable, then process flow moves to step 334 in which the selected link is added to the primary path.

Once a primary path is successfully computed, and an alternate path is effectively ensured as existing, then an alternate path may be computed. It should be appreciated that in some cases, even if an alternate path is not ensured as existing, an alternate path may still be in existence. By way of example, an alternate path may not be ensure as existing, yet may be in existence, in a mixed protection environment in which there is an unprotected link which exists in parallel with a protected link between two nodes.

As will be understood by those skilled in the art, the assurance that a segment of a primary path has a corresponding alternate path segment may be used as a criterion when selecting an appropriate primary path segment for use. For example, when there are two potential primary path segments which have effectively the same cost, e.g., use the same number of links and intermediate nodes, the existence of an alternate path segment may be used to facilitate a determination of which primary path segment to be used in an overall primary path. Alternatively, a potential primary path segment which has a greater cost than another potential primary path segment may be selected for use as a part of an overall primary path if the potential primary path segment that has a greater cost is known to have a corresponding alternate path segment while the cheaper potential primary path segment may not have a corresponding alternate path segment.

Figure 4:
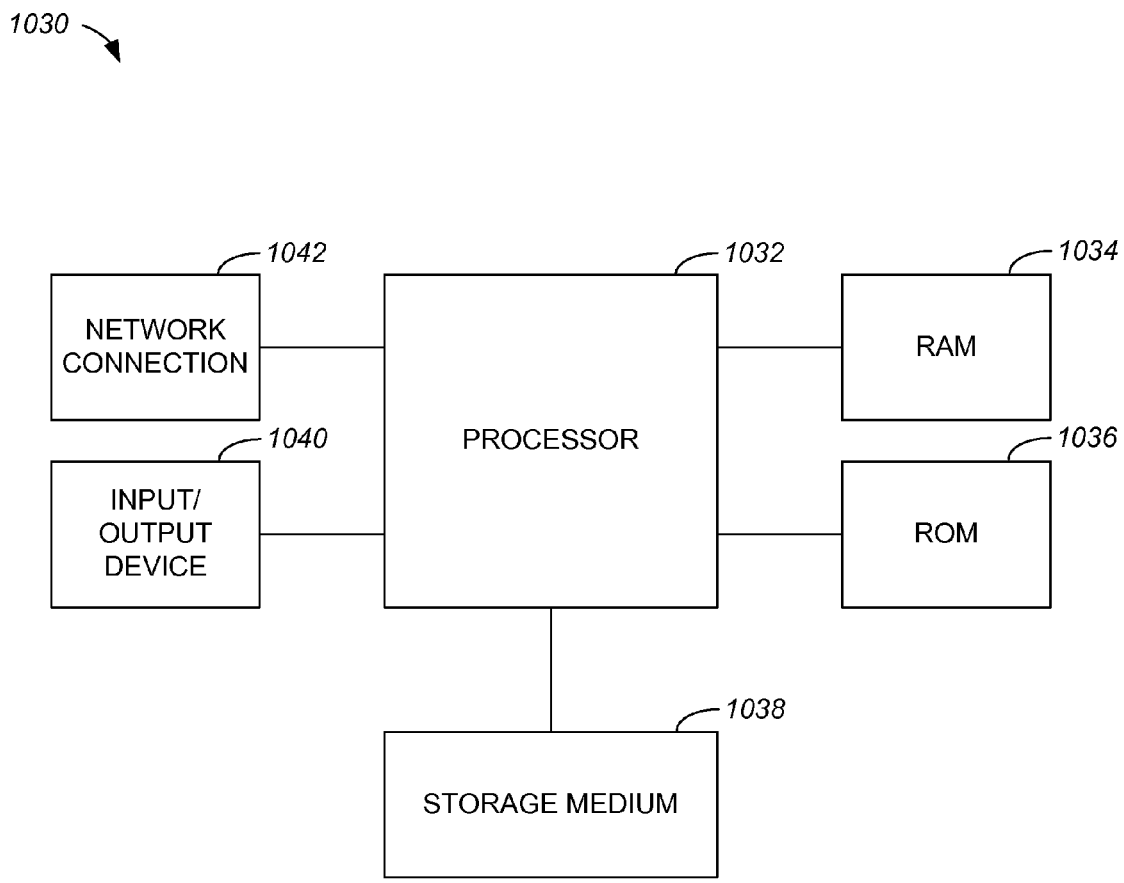
FIG. 4 is a representation of a computing device which is suitable for implementing the present invention.

The present invention may be implemented on a computing device which is in communication with a network element, e.g., a node, within a SONET, or substantially any other suitable network. By way of example, the methods of the present invention may be implemented on a personal computer or a UNIX-based computing system which communicates with network elements using a common object request broker architecture (CORBA). In one embodiment, a suitable computing device may be part of a node. FIG. 4 illustrates a typical, general purpose computing device or computer system suitable for implementing the present invention. A computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM acts to transfer data and instructions uni-directionally to the CPU 1032, while RAM is used typically to transfer data and instructions in a bi-directional manner. CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1042. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, while the present invention has been described as being suitable for use with respect to a TDM network that is subject to SONET standards, the present invention is suitable for a variety of different networks. Other suitable networks include, but are not limited to, networks that are subject to a synchronous digital hierarchy (SDH) standard.

In general, the steps associated with methods of computing a protected circuit path may be widely varied. Steps may be added, removed, altered, or reordered without departing from the spirit or the scope of the present invention. For example, in one embodiment, a link that in itself may not be protectable may be a part of an alternate path. As such, the steps associated with computing a protected circuit path may substantially eliminate verifying whether a link is protectable, and substantially directly verify if an unprotected path segment that includes the link has a corresponding alternate path.

Further, while the process of routing a protected path may effectively be terminated if the existence of an alternate path may not be validated during the course of routing a primary path, it should be appreciated that an attempt may still be made to route an alternate path in such a situation without departing from the spirit or the scope of the present invention. Therefore, the present examples are to be considered as illustrative and not restrictive, and the invention is not to be limited to the details given herein, but may be modified within the scope of the appended claims.

What is claimed is:

1. An apparatus for computing a primary path within a network, the network including a plurality of nodes and a plurality of links, the apparatus comprising:
   means for identifying a path segment, the means for identifying the path segment being arranged to identify an unprotected path segment included in the primary circuit path that includes at least one protected path segment, the unprotected path segment being defined to include a first unprotected link included in the plurality of links, the unprotected path segment further being defined to enable data to be transferred between a first node and a second node, the first node and the second node being included in the plurality of nodes, wherein the first unprotected link is not included in a blocked list, the blocked list being arranged to identify any node of the plurality of nodes and any link of the plurality of links which are included in the at least one protected path segment as being unavailable for selection; and
   means for validating, the means for validating being arranged to determine whether the network includes a first alternate path segment that corresponds to the unprotected path segment, the first alternate path segment being arranged to enable data to be at least partially transferred between the first node and the second node, wherein if the network includes the first alternate path segment, the first unprotected link is added to the primary circuit path.

2. An apparatus according to claim 1 further including:
   means for identifying a link, the means for identifying the link being arranged to identify the first unprotected link to be included in the primary circuit path.

3. An apparatus according to claim 2 wherein if the network does not include the first alternate path segment, the first unprotected link is not included in the primary circuit path, and the means for identifying the link further identifies a second unprotected link included in the plurality of links to be included in the primary circuit link.

4. An apparatus according to claim 2 wherein the means for identifying the link is further arranged to add the first unprotected link to the primary circuit path if the network includes the first alternate path segment.

5. An apparatus according to claim 2 wherein the unprotected path segment includes at least a second unprotected link included in the plurality of links.

6. An apparatus according to claim 2 wherein the means for validating is further arranged to determine when the first unprotected link is protectable.

7. A method for creating a circuit path within a network, the network including a plurality of nodes and a plurality of links, the method comprising:
   selecting a first unprotected link from the plurality of links, wherein the first unprotected link is not included in a blocked list, the blocked list being arranged to identify any node of the plurality of nodes and any link of the plurality of links which are included in at least one protected path segment of the circuit path as being unavailable for selection;
   identifying a first potential unprotected path segment, the first potential unprotected path segment including at least the first unprotected link, the first potential unprotected path segment further being arranged between a first node of the plurality of nodes and a second node of the plurality of nodes;
   automatically determining whether the first potential unprotected path segment has a corresponding first alternate path segment, the first alternate path segment being arranged between the first node and the second node, the first alternate path segment being automatically determined using the blocked list;
   adding the first unprotected link to the first potential unprotected path segment if the first potential unprotected path segment has a corresponding first alternate path segment; and
   designating the first potential unprotected path segment as an unprotected path segment of the circuit path when the first unprotected link is added to the first potential unprotected path segment.

8. A method as recited in claim 7 wherein the first potential unprotected path segment includes at least a second unprotected link included in the plurality of links.

9. A method as recited in claim 7 wherein if the first potential unprotected path segment does not have a corresponding first alternate path segment, the first unprotected link is not added to the first potential unprotected path segment.

10. A method as recited in claim 9 wherein when it is determined that the first potential unprotected path segment does not have a corresponding first alternate path segment, the method further includes:
    selecting a second unprotected link from the plurality of links;
    identifying a second potential unprotected path segment, the second unprotected path segment including at least the second unprotected link, the second potential unprotected path segment further being arranged between the first node and the second node; and
    automatically determining when the second potential unprotected path segment has a corresponding second alternate path segment using the blocked list, the second alternate path segment being arranged between the first node and the second node.

11. A method as recited in claim 7 wherein the blocked list is further arranged to identify at least one selected from the group including any node of the plurality of nodes or any link of the plurality of links that is required as a part of the circuit path as being unavailable for selection in the first alternate path segment.

12. A method as recited in claim 7 wherein the blocked list is one selected from the group including a table and an array.

13. A computer program product embodied on a computer-readable medium for creating a circuit path within a network, the network including a plurality of nodes and a plurality of links, the computer program product comprising:
   computer code that causes a first unprotected link to be selected from the plurality of links, wherein the first unprotected link is not included in a blocked list, the blocked list being arranged to identify any node of the plurality of nodes and any link of the plurality of links which are included in at least one protected path segment of the circuit path as being unavailable for selection;
   computer code that causes a first potential unprotected path segment to be identified, the first potential unprotected path segment including at least the first unprotected link, the first potential unprotected path segment further being arranged between a first node of the plurality of nodes and a second node of the plurality of nodes;
   computer code that causes a determination of when the first potential unprotected path segment has a corresponding first alternate path segment, the first alternate path segment being arranged between the first node and the second node, the first alternate path segment being automatically determined using the blocked list;
   computer code that causes the first unprotected link to be added to the first potential unprotected path segment when it is determined that the first potential unprotected path segment has a corresponding first alternate path segment; and
   computer code that causes the first potential unprotected path segment to be designated as an unprotected path segment of the circuit path when the first unprotected link is added to the first potential unprotected path segment.

14. A computer program product as recited in claim 13 wherein the first potential unprotected path segment includes at least a second unprotected link included in the plurality of links.

15. A computer program product as recited in claim 13 wherein if the first potential unprotected path segment does not have a corresponding first alternate path segment, the first unprotected link is not added to the first potential unprotected path segment.

16. A computer program product as recited in claim 15 wherein if the first potential unprotected path segment does not have a corresponding first alternate path segment, the computer program product further includes:
   computer code that causes a second unprotected link to be selected from the plurality of links;
   computer code that causes a second potential unprotected path segment to be identified, the second unprotected path segment including at least the second unprotected link, the second potential unprotected path segment further being arranged between the first node and the second node; and
   computer code that causes a determination to be made regarding whether the second potential unprotected path segment has a corresponding second alternate path segment, the second alternate path segment being arranged between the first node and the second node.

17. A computer program product as recited in claim 13 wherein the computer-readable medium is one selected from the group consisting of a hard disk, a CD-ROM, a DVD, a computer disk, a tape drive, and a computer memory.

18. A system for routing a primary path, the system comprising:
   computer code that causes a path segment to be identified, the computer code that causes the path segment to be identified being arranged to identify an unprotected path segment included in the primary circuit path, the primary circuit path being arranged to include at least one protected path segment the unprotected path segment being defined to include a first unprotected link included in the plurality of links, the unprotected path segment further being defined to enable data to be transferred between a first node and a second node, the first node and the second node being included in the plurality of nodes, wherein the first unprotected link is not included in a blocked list, the blocked list being arranged to identify any node of the plurality of nodes and any link of the plurality of links which are included in the at least one protected path segment of the circuit path as being unavailable for selection;
   computer code that validates, the computer code that validates being arranged to determine if the network includes a first alternate path segment that corresponds to the unprotected path segment, the first alternate path segment being arranged to enable data to be at least partially transferred between the first node and the second node, wherein if the network includes the first alternate path segment, the first unprotected link is added to the primary circuit path;
   a computer-readable medium that stores the computer codes; and
   a processor that executes the computer codes.

19. A system according to claim 18 further including:
   computer code that causes a link to be identified, the computer code that causes the link to be identified being arranged to identify the first unprotected link to be included in the primary circuit path.

20. An system according to claim 19 wherein if the network does not include the first alternate path segment, the first unprotected link is not included in the primary circuit path, and the computer code that causes the link to be identified identifies a second unprotected link included in the plurality of links to be included in the primary circuit path.

21. A method for creating a circuit path within a network, the network including a plurality of nodes and a plurality of links, the method comprising:
   identifying a first potential unprotected path segment, the first potential unprotected path segment including at least a first unprotected link, the first potential unprotected path segment further being arranged between a first node of the plurality of nodes and a second node of the plurality of nodes, wherein the first unprotected link is not included in a blocked list, the blocked list being arranged to identify any node of the plurality of nodes and any link of the plurality of links which are included in the at least one protected path segment as being unavailable for selection;
   determining whether the first potential unprotected path segment has a corresponding first alternate path segment, the first alternate path segment being arranged between the first node and the second node; and adding the first unprotected link to an unprotected segment of the circuit path if the first potential unprotected path segment has the corresponding first alternate path segment.

22. A method as recited in claim 21 wherein the first potential unprotected path segment includes the unprotected segment of the circuit path.

23. A method as recited in claim 21 wherein if when it is determined that the first potential unprotected path segment does not have the corresponding first alternate path segment, the method further includes:

identifying a second potential unprotected path segment, the second potential unprotected path segment including a second unprotected link;

determining when the second potential unprotected path segment has the corresponding first alternate path segment, the first alternate path segment being arranged between the first node and the second node; and adding the second unprotected link to the unprotected segment of the circuit path if the second potential unprotected path segment has the corresponding first alternate path segment.

24. A method as recited in claim 23 wherein the second potential unprotected path segment includes the unprotected segment of the circuit path.

25. A method as recited in claim 21 wherein determining when the first potential unprotected path segment has the corresponding first alternate path segment includes substantially automatically determining when the first potential unprotected path segment has the corresponding first alternate path segment.

26. A computer pro-gram product embodied on a computer-readable medium for creating a circuit path within a network, the network including a plurality of nodes and a plurality of links, the computer program product comprising:

computer code that causes a first potential unprotected path segment to be identified, the first potential unprotected path segment including at least a first unprotected link, the first potential unprotected path segment further being arranged between a first node of the plurality of nodes and a second node of the plurality of nodes, wherein the first unprotected link is not included in a blocked list, the blocked list being arranged to identify any node of the plurality of nodes and any link of the plurality of links which are included in at least one protected path segment of the circuit path as being unavailable for selection;

computer code that causes a determination to be made regarding when the first potential unprotected path segment has a corresponding first alternate path segment, the first alternate path segment being arranged between the first node and the second node; and computer code that causes the first unprotected link to be added to an unprotected segment of the circuit path if the first potential unprotected path segment has the corresponding first alternate path segment.

27. A computer program product as recited in claim 26 wherein the first potential unprotected path segment includes the unprotected segment of the circuit path.

28. A computer program product as recited in claim 27 wherein if the first potential unprotected path segment does not have the corresponding first alternate path segment, the computer program product further includes:

computer code that causes a second potential unprotected path segment to be identified, the second potential unprotected path segment including a second unprotected link;

computer code that causes a determination to be made regarding if the second potential unprotected path segment has the corresponding first alternate path segment, the first alternate path segment being arranged between the first node and the second node; and computer code that causes the second unprotected link to be added to the unprotected segment of the circuit path if that the second potential unprotected path segment has the corresponding first alternate path segment.

29. A computer program product as recited in claim 26 wherein the computer-readable medium is one selected from the group consisting of a hard disk, a CD-ROM, a DVD, a computer disk, a tape drive, a computer memory, and a data signal embodied in a carrier wave.

30. An apparatus for computing a primary path within a network, the network including a plurality of nodes and a plurality of links, the apparatus comprising:

a path segment identifying device, the path segment identifying device being arranged to identify an unprotected path segment included in the primary circuit path, the primary circuit path including at least one protected path segment, the unprotected path segment being defined to include a first unprotected link included in the plurality of links, the unprotected path segment further being defined to enable data to be transferred between a first node and a second node, the first node and the second node being included in the plurality of nodes, wherein the first unprotected link is not included in a blocked list, the blocked list being arranged to identify any node of the plurality of nodes and any link of the plurality of links which are included in the at least one protected path segment as being unavailable for selection; and a validating device, the validating device being arranged to determine when the network includes a first alternate path segment that corresponds to the unprotected path segment, the first alternate path segment being arranged to enable data to be at least partially transferred between the first node and the second node, wherein if the network includes the first alternate path segment, the first unprotected link is added to the primary circuit path.

31. An apparatus according to claim 30 further including:

a link identifying device, the link identifying device being arranged to identify the first unprotected link to be included in the primary circuit path.

32. An apparatus according to claim 31 wherein when it is determined that the network does not include the first alternate path segment, the first unprotected link is not included in the primary circuit path, and the link identifying device identifies a second unprotected link included in the plurality of links to be included in the primary circuit path.

33. An apparatus according to claim 31 wherein the link identifying device is further arranged to add the first unprotected link to the primary circuit path when it is determined that the network includes the first alternate path segment.

34. An apparatus according to claim 31 wherein the validating device is further arranged to determine when the first unprotected link is protectable.

35. An apparatus according to claim 34 wherein the first unprotected link is arranged between a third node and a fourth node, and determining when the first unprotected link is protectable includes determining when at least one other unprotected links included in the plurality of links is suitable for transferring data between the third node and the fourth node.

36. An apparatus according to claim 31 wherein the unprotected path segment includes at least a second unprotected link included in the plurality of links.

* * * * *